Nov. 30, 1954
F. STEINBRECKER
2,695,588
MICROMETER DIAL MECHANISM
Filed Dec. 3, 1952
2 Sheets-Sheet 1
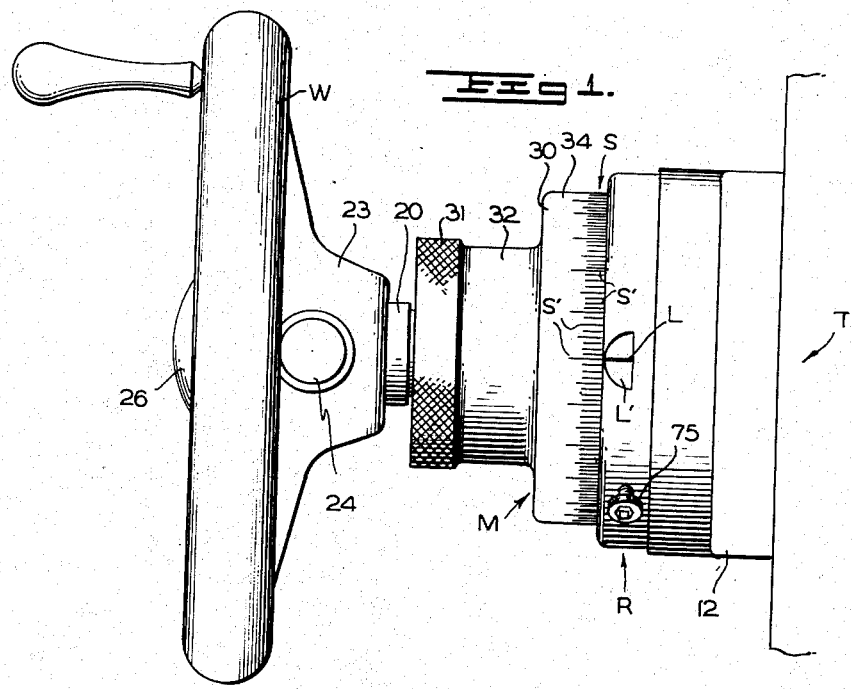
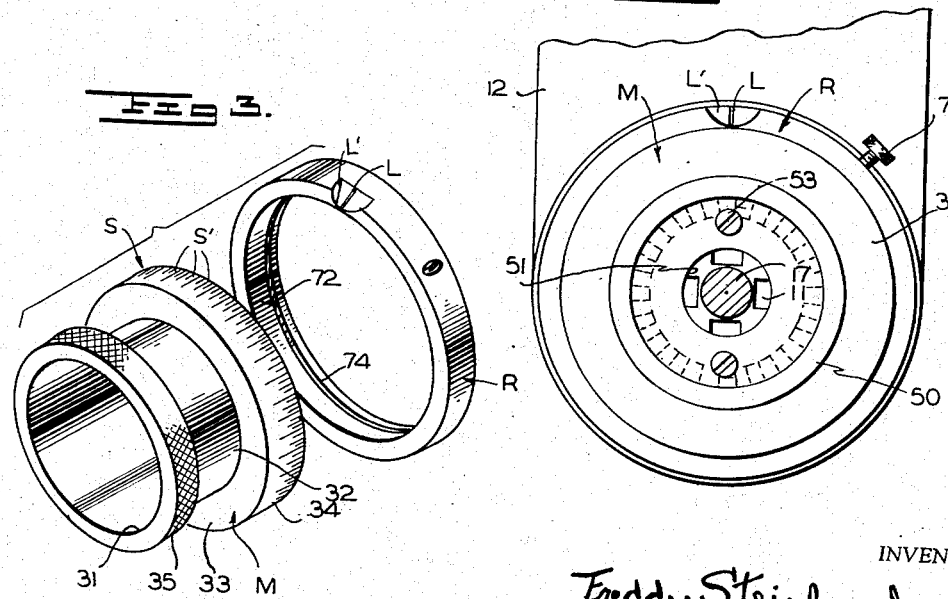
INVENTOR:
Freddy Steinbrecker
BY Peck + Peck
ATTORNEYS.

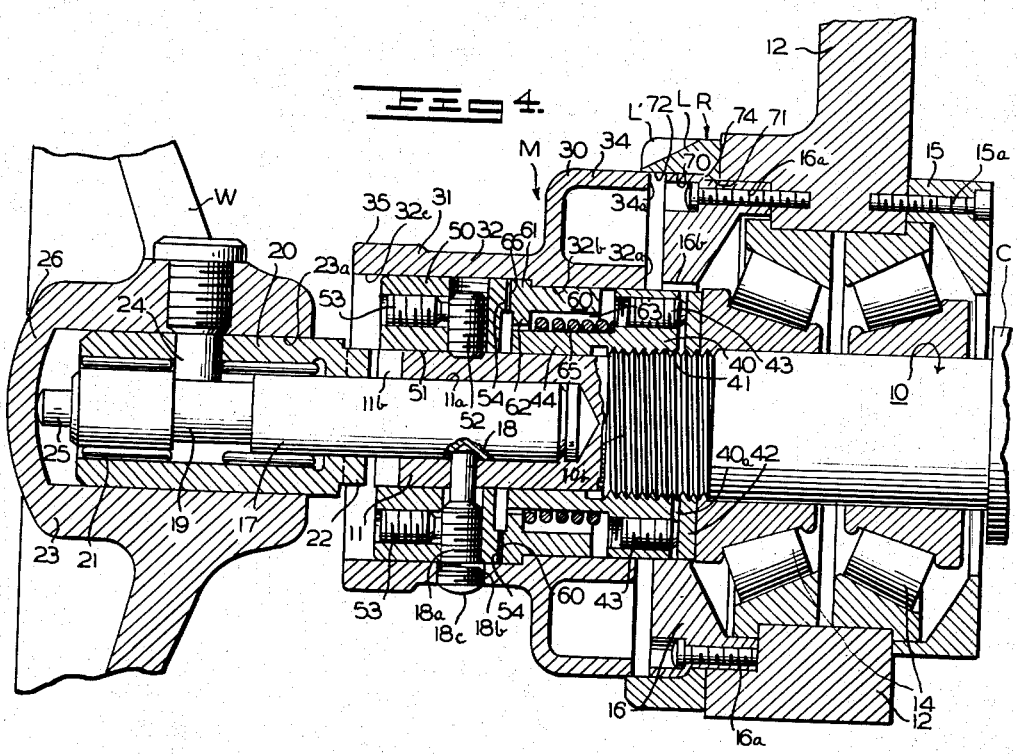
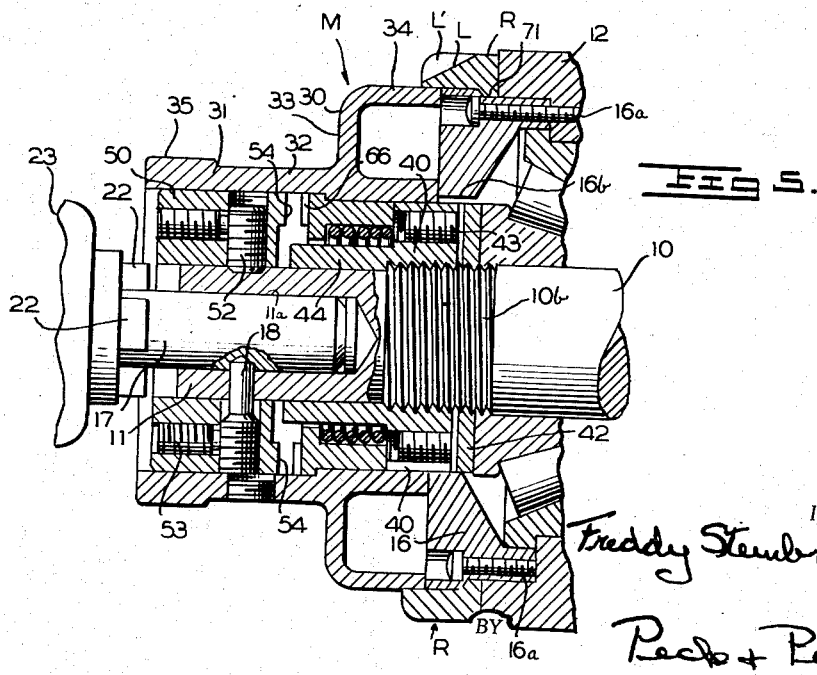

United States Patent Office 2,695,588
Patented Nov. 30, 1954

2,695,588

MICROMETER DIAL MECHANISM

Freddy Steinbrecker, Racine, Wis., assignor to George Gorton Machine Co., Racine, Wis., a corporation of Wisconsin Application December 3, 1952, Serial No. 323,838

10 Claims. (Cl. 116—124)

This invention relates to certain improvements in micrometer dial mechanism, and particularly such dial mechanisms as used on milling, grinding, boring and such-like machine tools; and the nature and objects of the invention will be readily recognized and understood by those skilled in the art in the light of the following explanation and detailed description of the accompanying drawings illustrating what I now believe to be a preferred embodiment or mechanical expression of my invention from among various other embodiments, expressions, forms, designs, constructions, adaptations and combinations, of which the invention is capable within the broad spirit and scope thereof as defined by the appended claims.

Micrometer dial mechanisms are generally characterized by a circular dial member or disc which is adjustably mounted on and concentric with a rotary element such as a feed screw, for rotation therewith as such element or feed screw is rotated to effect linear movement of another element operatively connected therewith. The micrometer dial of such a mechanism is provided with a micrometer scale in visible position thereon and therearound having scale divisions corresponding to increments of straight line or linear movement of the element to be actuated and fed by the feed screw The dial of such a mechanism is usually mounted in position on a rotary element, such as a feed screw, the degree of rotation of which is to be measured from the dial in terms of resulting linear distances of feed of the element effected by rotation of the feed screw. The dial is usually mounted in an adjusted position on the feed screw adjacent relatively fixed structure having thereon a reading point or index line immediately adjacent the scale around the dial for a visual reading of the scale against such index point or line. In order to adjust the dial and its micrometer scale relative to the position of the feed screw and the element actuated thereby, the dial is usually mounted for independent rotation on the feed screw, with means being provided for releasably securing the dial in any adjusted position thereof on and relative to the feed screw.

The use of such micrometer dials on various types of machines, and particularly those machines in which a rotary member or feed screw is power driven, has presented various problems and difficulties, certain of which are overcome and effectively solved by the micrometer design, arrangement and construction disclosed and claimed in the United States patent to Henkes and Miottel No. 2,612,134, dated September 30, 1952. Micrometer dial mechanisms embodying my present invention may be considered to be improvements as to certain features thereof on the micrometer dial mechanism of the aforesaid Patent No. 2,612,134.

One of the principal objects of my invention is to provide a micrometer dial mechanism of the general class referred to hereinabove, which will be of substantially simplified structure having a minimum number of parts with a reduction in the number of separate moving and operational parts.

Another object is to provide such a dial mechanism of a design and construction which is capable of being manufactured at relatively low cost while retaining for the mechanism the critically essential characteristics of accuracy and precision under the varying conditions of operation and use.

Another object is to provide a design of micrometer dial and manual operating knob therefor as a one-piece, integral component of a simple construction to efficiently combine with and house the components of the dial mechanism with which it is structurally and operationally associated.

Another object is to provide such a dial mechanism with which it is possible to obtain infinite settings of the dial.

Another object is to provide such a dial mechanism which is capable of fast operation with ease of manual manipulation and a high degree of accuracy of results.

Another object is to provide an improved design and mounting of index ring in cooperative association with the infinitely adjustable micrometer dial of the mechanism.

With the foregoing and certain other objects, features and results in view which will be readily apparent from the following detailed description and explanation of the illustrated example embodiment of dial mechanism, my invention consists in certain novel features in design and in construction of parts and components as well as in the various combinations thereof, all as will be more fully referred to and specified hereinafter.

Referring to the accompanying drawings in which similar reference characters refer to corresponding parts throughout the several figures thereof:

Fig. 1 is a view in top plan of an example embodiment of a micrometer dial mechanism of the invention mounted on the cross feed screw of a milling machine, a fragmentary portion only of which is shown.

Fig. 2 is a vertical transverse section taken as on the line 2—2 of Fig. 4.

Fig. 3 is a perspective view of the index ring and the integral dial and knob component removed from the assembled mechanism and separated but shown in the relative positions assumed by these members when assembled.

Fig. 4 is a vertical longitudinal or axial section taken as on the line 4—4 of Fig. 1, showing the dial and knob unit in normal position in driven connection with the feed screw.

Fig. 5 is a vertical longitudinal section similar to Fig. 4, but showing the knob and dial unit in its inwardly displaced position on the feed screw disengaged from driven connection therewith for independent adjustment of the dial thereon.

The micrometer dial mechanism of my invention disclosed herein is of a type adapted to and primarily intended for mounting on and in operative association with a power driven feed screw of a machine tool, such for example as a milling machine having a knee, saddle and work table assembly. While I have shown such an embodiment of the invention as an example for purposes of explanation, it is to be understood that the invention is not limited or restricted to embodiment in micrometer dial mechanisms for any particular feed screw of a milling machine or other machine tool, or to mounting in combination with feed screws, as the invention contemplates and includes within its scope expressions thereof in various forms and adaptations for precise measurements resulting from or by rotation of any form of rotary shaft or other rotary element.

The example embodiment of the invention, referring now to Fig. 1, is shown as mounted on and in operative association with a table mounted feed screw of a knee, saddle and table assembly (not shown) of a milling machine, of which a portion of the forward wall T of the milling machine assembly is shown. The feed screw C, referring now to Fig. 1 in connection with Fig. 4, extends forwardly through and outwardly beyond the forward wall T. The forward length only of this feed screw C is shown and, in this instance, the feed screw may be considered to be of any of the power driven types also capable of manual rotation, all as will be familiar to those skilled in the machine tool art.

The forward end of feed screw C extends through a wall structure T of the machine assembly and is provided with an integral extension 10 thereof forming a shaft portion which extends forwardly a distance outwardly beyond wall T. The shaft extension 10 of feed screw C provides by its extreme outer end length a slightly reduced external diameter portion forming a micrometer dial-mounting stub shaft 11 on the outer end of which a manual operating member for the feed screw C is adapted to be mounted. The integral shaft extension 10 of feed screw C is provided with the external threading 10b therearound adjacent the inner end of the reduced diameter stub shaft portion 11 for a purpose to be referred to hereinafter.

The forwardly extended shaft portion 10 of cross feed screw C is journaled in an anti-friction bearing assembly which is mounted and assembled in a bracket structure 12 suitably secured in mounted position on and supported from the forward wall T of the machine assembly. This bearing assembly includes the opposed sets of annular roller bearings 14 of the combined radial and thrust types mounted in bracket 12 and receiving therethrough and journalling therein the extension shaft portion 10 of feed screw C, as will be clear by reference to Fig. 4. The bearings 14 are secured and constrained in mounted, assembled position in bracket 12 by bearing caps or plates 15 and 16 attached to bracket 12 at opposite sides thereof, respectively, by machine screws or the like 15a and 16a. The bearing cap 15 may be preferably on the table wall T and is attached to the bracket 12 by the screws 15a, while the bearing cap 16 which is at the outer side of bracket 12 and the bearing assembly 14 therein, is attached on and to the bracket 12 by the screws 16a.

The reduced diameter stub shaft 11 is formed with an axial bore 11a extending thereinto from an opening through the forward end thereof. The outer end of shaft 11 is provided with the forwardly extended clutch teeth 11b spaced apart thereon and therearound. As the feed screw C of the instant example may be taken to be of the power driven type, it is necessary or desirable to provide for manual rotation of the feed screw. In this example such manual rotation of feed screw C is effected by a hand wheel W mounted on a hand wheel shaft 17 which is mounted in the bore 11a of stub shaft 11 in position projecting a distance forwardly therefrom. The shaft 17 is secured in fixed position in the bore 11a of shaft 11 by means of the lock screw 18 which is extended radially through shaft 11 and received in a locking recess in the hand wheel shaft 17. The construction and threaded mounting of this lock screw 18 in the associated elements of the micrometer dial mechanism proper will be referred to in detail hereinafter. The hand wheel shaft 17 extends outwardly beyond the toothed end of shaft 11 and is formed in the portion thereof extended outwardly from stub shaft 11, with an annular, relatively wide groove 19 therearound, as will be clear by reference to Fig. 4.

A clutch sleeve 20 is slidably mounted on and over the extended length of hand wheel shaft 17, being journaled on shaft 17, preferably by the needle or rolling bearings 21 mounted within clutch sleeve 20 and between that sleeve and the shaft 17. Thus, the hand wheel shaft 17 is rotatable by and with shaft 11 of the feed screw C, independently of clutch sleeve 20. The clutch sleeve 20 is also adapted for movements inwardly and outwardly on and axially of shaft 17 independently of that shaft, and is provided around its inner end with the clutch teeth 22 extended axially therefrom and complementary to the clutch teeth 11b of stub shaft 11. The clutch sleeve teeth 22 are adapted to be engaged with and disengaged from the teeth 11b by movement of the sleeve inwardly and outwardly on shaft 17.

The hand wheel W is formed with a hub 23 having an axial bore 23a in which the clutch sleeve 20 is slidably received with the wheel W thus mounted on the clutch sleeve in operative position on the hand wheel shaft 17. A locking pin 24 is threaded radially through hub 23 of wheel W and extends radially through locking sleeve 20 into the annular groove 19 in hand wheel shaft 17. The locking screw 24 has an external diameter less than the width of the groove 19 and is dimensioned and machined for sliding movements in that groove axially thereof and angularly therearound. This locking screw 24 locks the clutch sleeve 20 and the hand wheel W together for functioning as a unit assembly so that by pushing inwardly on the hand wheel such assembly is displaced as a unit inwardly on shaft 17 to position with the clutch teeth 22 engaged with clutch teeth 11b of stub shaft 11. With these clutch teeth engaged the feed screw C may be then rotated by rotation of the hand wheel W. The unit assembly of hand wheel W and clutch sleeve 20 is displaceable outwardly on shaft 17 from position with the clutch teeth engaged, to the normal position thereof as shown in Fig. 4, with the clutch teeth 22 disengaged from clutch teeth 11b, so that the hand wheel W is then freely rotatable on shaft 17 with that shaft being freely rotatable in the clutch sleeve 20 independently of that sleeve and the hand wheel. In such disengaged position of the hand wheel the feed screw C may be power driven without resulting powered rotation of the hand wheel W thereby. As will be understood in the art such power rotation of hand wheel W must not be possible to the handle wheel because of the extreme danger of injury to an operator by inadvertent contact therewith.

In this example, the hand wheel W is normally biased and held in its declutched position of Fig. 4 disengaged from cross feed screw C, by a spring loaded plunger 25 reciprocally mounted in the outer end of shaft 17 and projecting therefrom into engagement with the outer side wall 26 of hub 23 of the hand wheel W. The outward movement of hand wheel W on spindle 17 is limited and determined by the engagement of locking pin 24 with the forward side wall of the slot 19 in the shaft 17. (See Fig. 4.)

The micrometer dial mechanism of the example embodiment of the invention includes the dial unit M adapted to be mounted in position on and concentric with the shaft extension 10 and stub shaft 11 of the feed screw C, and the cooperating index ring R which is mounted on the bearing cap 16 of the bearing assembly on bracket 12 in position concentric with the dial unit for rotation to adjusted positions relative to the dial unit. The dial unit M is mounted for movements axially of the shafts 10 and 11, and of index ring R, between a position in driven connection with such shafts and the feed screw C, and a position disconnected therefrom for rotation independently thereof to adjusted positions relative thereto and to the index ring R.

The micrometer dial unit M of the specific example hereof, includes the dial body 30 and the forwardly extended operating knob 31 constituted by an integral, one-piece structure. The dial unit M includes a tubular casing or sleeve portion 32 with the dial body 30 integral therewith and comprised by the circular base 33 integral with tubular casing 32 and extending radially outwardly therefrom and therearound, and the angularly disposed flange extended laterally from and around base 33 to provide the circular side wall 34 of the dial body. The tubular casing or sleeve 32 extends outwardly from the outer side of the dial body base 33 and terminates at its outer end in the knurled finger grasping rim 35 therearound, which thus constitutes the manual operating knob for the dial unit M. The free edge 34a of the circular side wall 34 of dial body 30 and the adjacent end edge 32a of the tubular casing 32 at the dial body end thereof are, in this example, both formed and positioned to lie in one plane normal to the axis of the dial unit, as will be clear by reference to Fig. 4. The internal diameter of the bore 32b of the tubular casing 32 of the dial unit is formed of slightly increased diameter from a location adjacent the base 33 of the dial body to and through the knurled rim 35 of the operating knob 31 to provide a counterbore 32c, for a purpose which will be referred to in detail hereinafter.

The mounting for the dial unit M on the stub shaft 11 of the feed screw C includes, referring to Figs. 4 and 5, a dial clamp plate 40 which is of circular form having an axial bore 41 therethrough provided with internal threading therein. This dial clamp plate 40 is threaded onto the external threading 10b on the shaft portion 10 of feed screw C into a position extended through a circular opening 16b in the bearing assembly cap 16 and into engagement against the outer side of the adjacent bearing assembly 14 secured within the bracket 12 between the bearing caps 15 and 16. In this particular example the clamp plate 40 is provided with an annular cut 40a therearound adjacent the inner side thereof to provide the circular clamping disc 42 for clamping engagement against the adjacent bearing assembly 14. Clamping screws 43 are threaded inwardly through the body of the clamp plate 40 into engagement with the inner side of the clamping disc 42 for forcing that disc into clamping engagement. The clamp plate 40 is formed with an integral tubular sleeve or hub 44 extended from the outer side thereof along the stub shaft 11. The sleeve 44 is of substantially reduced external diameter relative to the external diameter of the clamp plate 40 and has the internal bore therethrough of a diameter to slidably receive and fit on the stub shaft 11 with the clamp plate 40 in mounted position threaded onto the shaft portion 10 of feed screw C. The length of the sleeve or extended hub 44 of clamp plate 40 is such that with the latter in mounted position, the forward end of the sleeve 44 is spaced inwardly on the stub shaft 11 from the outer, toothed end of that shaft with its forward edge lying in a plane located slightly forwardly of the base 33 of the dial body 30. (See Figs. 4 and 5.)

The micrometer dial unit M is positioned on and concentric with the stub shaft 11 and the feed screw extension shaft 10 with the inner end of the tubular sleeve 32 of the dial unit being slidably received on and around the portion of the circular clamp plate 40 which projects outwardly beyond bearing cap 16. In its mounted position the dial unit M has the inner side of dial body adjacent but normally spaced outwardly a distance from the outer side of the bearing assembly cap 16. The outer side of the bearing cap 16 forms the abutment surface adapted to be engaged by the inner side edges 32a and 34a of the dial unit to limit movement inwardly of the dial unit on the clamp plate 40. Thus mounted, the sleeve 32 of the dial unit M extends outwardly along and over the stub shaft 11 concentric therewith but spaced outwardly therefrom and therearound. Similarly, the sleeve 32 of the dial unit M is concentric with and spaced outwardly from and around the forwardly extended hub sleeve 44 of the clamp plate 40.

A dial drive clutch member 50 in the form of a cylindrical block having an axial bore 51 therethrough to receive therein the stub shaft 11 is mounted on and concentric with that shaft between the shaft and the sleeve 32 of the micrometer dial unit M. This dial drive clutch member 50 has an external diameter to be slidably received in and fit the enlarged diameter bore 32c of the outer end length of the dial unit sleeve 32, so as to form with the clamp plate 40 the mounting and bearing surfaces on which the dial unit M is assembled and is reciprocal between a position in driven connection with the feed screw C and a position disconnected therefrom for independent rotation and adjustment of the dial unit on and relative to the feed screw. The dial drive clutch member 50 is secured in fixed position on the stub shaft 11 by the set screw or screws 52 and by the lock screw 18 which has the external threaded shank 18a thereof threaded into an internally threaded bore extended radially through member 50 at a location therein spaced therearound from the set screw 51. The lock screw 18 is accessible for assembly and disassembly through a suitable bore or opening 18b formed through the sleeve 32 of dial unit M, with this bore being closed if desired by a suitable plug 18c threaded thereinto. Set screws 53 are threaded through suitable internally threaded bores opening through the outer side of the dial drive clutch member 50, into locking engagement against the adjacent sides, respectively, of the screw or screws 52 and the locking screw 18, as will be clear by reference to Figs. 4 and 5.

The dial drive clutch member 50 is positioned on the stub shaft 11 within the counterbore 32c of the dial unit M with its outer or forward side approximately in the plane of the outer edges of the clutch teeth 11b at the end of the stub shaft 11. So positioned, the inner side of the dial drive clutch member 50 is located at or adjacent the plane of the forward end edge of the hub sleeve 44 of the clamp plate 40. In the normal, forwardly displaced position of the dial unit M, the forward end of that unit which provides the knurled finger grasping rim 35 extends a distance forwardly or outwardly beyond the outer side of clutch member 50 and the outer, toothed end of stud shaft 11. In this instance, the forward edge of rim 35 lies in a plane normal to and passing through the clutch sleeve 20 at the inner or base ends of the clutch teeth 22 on that sleeve. The dial drive clutch member 50 is provided on the inner side thereof with an annular series of clutch teeth 54 therearound adjacent the periphery of the clutch member with these teeth being spaced apart and radially disposed, as will be clear by reference to Figs. 2, 4 and 5. The clutch teeth in this particular form of the drive clutch member 50 project inwardly from the general rear surface of the member with that rear surface spaced forwardly a distance from the forward edge of hub sleeve 44 of the clamp block 40. Thus, the clutch member 50 is rotatable with the stub shaft 11 of the feed screw C, while the dial unit M is slidably mounted for reciprocation axially of member 50, and, as will be hereinafter developed, the dial unit M is also adapted to be engaged with clutch member 50 for rotation as a unit therewith.

A dial clutch member 60 is positioned within the bore 32b of the dial unit M, and is attached to that unit for rotation therewith. This dial clutch is in the form of a ring or annulus secured in the bore 32b of the sleeve 32 of the dial unit in position spaced a distance forwardly from the forward side of clamp block 40 to provide a space therebetween for clearance to permit of inward displacement of the dial unit M with the dial clutch 60 to its limit of inward displacement. At its forward end the dial clutch 60 is formed with a radially outwardly extended flange 61 therearound which is engaged over and against the shoulder formed between bore 32b and the counterbore 32c. The flange 61 has an external diameter such that it fits the counterbore 32c and is preferably in engagement with the wall of that bore. The dial clutch 60 is also formed at its forward end with a radially inwardly projected flange 62 therearound to provide a ring portion having a bore through which the forward end of hub sleeve 44 of clamp plate 40 extends, with such bore having a diameter greater than the external diameter of hub sleeve 44 to form an annular clearance space between the inner edge of flange 62 and the hub sleeve 44. The internal diameter of the dial clutch 60 is greater than the internal diameter of the ring flange 62 thereof, so that there is formed between the inner surface of dial clutch 60 and the external surface of hub sleeve 44, a spring retaining space 63 around hub 44 and extending between the forward side of clutch plate 40 and the rear or inner side of the flange 62 of dial clutch member 60.

A coiled expansion spring 65 is mounted within the space 63 and is engaged at its opposite ends with and under compression between clamp plate 40 and the flange 62 of dial clutch 60. This spring 65, thus mounted, acts to continuously bias dial clutch 60 and the dial unit M which is rigidly fixed thereto, bodily forwardly as a unit toward the drive clutch member 50 on which the dial unit M is slidably mounted. On the forward side of dial clutch 60 and of the flange 61 thereof, there is formed and provided an annular series of clutch teeth 66, with the teeth 66 of such series being spaced apart in positions facing the teeth 54 on the drive clutch member and being adapted to be interengaged or meshed therewith in clutching engagement when the dial unit M is in the normal, forwardly displaced position thereof shown in Fig. 4. With clutch teeth 52 and clutch teeth 66 in clutching engagement the dial unit M is then in driven engagement with the stub shaft 11 of feed screw C, so that, rotation of the feed screw results in rotation of the dial unit M therewith. When the dial unit M is pressed inwardly by finger ring 35 of the dial unit actuating knob, and displaced axially on and relative to clamp plate 40 and the dial drive clutch member 50 toward the forward side of the bearing cap 16, the clutch teeth 66 of the dial clutch 60 are moved thereby to positions disengaged from clutch teeth 54 of the drive clutch member 50. The dial unit M is then disconnected from driven connection with shafts 11 and 10 of the cross feed screw and from that screw. This declutched and disconnected position of dial unit M is shown in Fig. 5, and when the dial unit is in such position, it may then be readily manually rotated on and independently of the clamp plate 40 and drive clutch member 50 to any desired adjusted position on and around and relative to feed screw C and its integral extension shaft 10 and stub shaft 11.

The micrometer dial unit M is provided with a scale S on or around the exterior of the side wall or skirt 34 of the dial body 30. This scale S includes the division lines S' spaced apart therearound and extending to the rear edge 34a of the dial body side wall. The scale divisions S' of such a micrometer scale S are usually spaced to represent thousandths of an inch of linear movement of the element, such as a work table or the like, with which the feed screw C is operatively connected, so that, a rotation of the feed screw through a distance equal to one spacing between the scale divisions S' will effect a linear movement of the work table or other element with which feed screw C is connected through a distance of one thousandth of an inch. Obviously, the invention is in no sense limited or restricted to any particular arrangement or spacing of the scale divisions S' making up the scale S. It is desirable, however, and tends to increase the efficiency of scale reading and reduce reading error, to have the scale divisions S' located on the dial body side wall 34, as shown in this example, and extended rearwardly to the edge 34a of the dial body. This is so because in the operation and functioning of the dial unit M, it is necessary for the operator to read the scale S visually against an index line or mark provided on the index ring R, as will be explained hereinafter.

The index ring R in the form thereof adapted for use with the example embodiment of the invention, is mounted on the bearing cap 16 in position truly concentric with the axis of the feed screw and its shafts 10 and 11 and with the dial body 30 and the scale S thereon of the dial unit M. In this instance, the bearing cap 16 projects or extends a distance forwardly and outwardly beyond the forward side surface of bracket 12, and this forwardly extended portion of cap 16 is formed to provide the circular bearing surface 70 therearound truly concentric with the common axis of the feed screw C and its shafts 10 and 11. This concentric, annular bearing surface 70 has a diameter preferably equal to the external diameter of the circular side wall 34 of the dial body 30, as will be clear by reference to Figs. 4 and 5. At the rear side of this surface 70 the bearing cap 16 is provided with the annular groove 71 therein having a width to substantially occupy the space between the circular bearing surface 70 and the adjacent forward surface of the bracket 12.

The index ring R is precisely machined or otherwise formed to provide the truly circular, internal bearing surface 72 therearound of an internal diameter substantially equal to the external diameter of the circular bearing and mounting surface 72 of the bearing cap 16, so as to form a sliding bearing fit with the bearing surface 72. The ring R at one side thereof is formed with a radially inwardly disposed flange 74 therearound of a width adapted to fit into and form a relatively tight bearing fit in the groove 71 formed in the bearing cap 16. Thus formed, the index ring R is mounted and assembled in position on and around the annular bearing surface 70 of bearing cap 16, with the flange 74 of ring R being slidably received in the groove 71 at and around the rear side of the ring bearing surface 70. The width of index ring R is preferably such that in mounted position thereof the rear side surface engages slidably on and against the adjacent forward side surface of the bearing block 16, and the forward portion of the ring extends a slight distance over and around the exterior surface of the side wall 34 of dial body 30 and the scale S formed on and around that surface. Preferably the rear surface of ring R and the portion of the forward surface of bracket 12 engaged thereby, are precisely machined or otherwise formed to provide smooth, minimum friction bearing surfaces lying in a plane precisely normal to the axis of ring R. Thus mounted, the ring R is rotatable on and around bearing cap 16 to positions of adjustment thereon relative to the dial unit M and the feed screw C, being retained in its mounted position against displacement by the flange 71 in the groove 72.

In this example the index ring R is provided with an index mark or line L disposed transversely thereof on the outer side of the ring for cooperative relation with the scale S on the dial body 30 and for reading of that scale visually against such index line. The line L, as in the particular form here shown, may be provided as a forwardly and inwardly inclined line formed along the center of a milled out groove or hollow L' in and disposed transversely of the forward side of the index ring R. This index line L, thus formed, has its forward end located in immediate proximity to the scale S to thus materially aid in correct reading of the scale against the index line.

In order to releasably secure the index ring R in any desired position of adjustment thereof to which it may be rotated on bearing cap 16, a locking thumb screw 75 is threaded in position extended radially through ring R for locking engagement at its inner end with the surface 70 of bearing cap 16 on which the ring R is rotatably mounted. By loosening thumb screw 75, the index ring R may then be rotated in either direction on bearing cap 16 to any desired adjusted position thereon relative to the feed screw C and relative to the position of the micrometer dial 30 and the scale S thereon.

In the operation and use of the micrometer dial mechanism of the present example, the normal position of the micrometer dial unit M thereof is dictated by the biasing spring 65 which yieldingly holds the unit displaced forwardly with the clutch teeth 66 of dial clutch 60 engaged and clutched with the clutch teeth 54 of the dial drive clutch 50. As dial clutch 60 is fixed to the dial unit sleeve 32 and as the dial drive clutch 50 is secured and fixed to stub shaft 11 of the feed screw C, it follows that rotation of the feed screw will rotate the dial unit M and its associated mounting and operating components as a unit with the stub shaft 11 and the feed screw C of which the stub shaft forms an axial extension. In this normal operating position, if the feed screw C is being power rotated, the hand wheel W will be permitted to assume and remain in its normal position declutched from the stub shaft 11, under the biasing action of the spring loaded pin or plunger 25, as referred to hereinbefore. If, on the other hand, the feed screw C is not being power driven and it is desired to rotate it by the hand wheel W, the latter is merely forced inwardly on the hand wheel shaft 17 into position with clutch teeth 22 of the hand wheel assembly engaged with clutch teeth 11b of the stub shaft 11.

If it becomes necessary to adjust the micrometer dial unit M on and relative to feed screw C and the index line L on the index ring R, it is only necessary for the operator to grasp the knurled rim 35 of the knob forming sleeve 32 of unit M, and push inwardly thereon to override biasing spring 65 sufficiently to disengage the clutch teeth 66 of dial clutch 60 from the clutch teeth 54 of the dial drive clutch member 50. When the clutch teeth 66 are disengaged from teeth 54, the dial unit M is then freely rotatable in either direction on clamp plate 40 and dial drive clutch 50 to any desired position of angular adjustment relative thereto and to the feed screw C and the index line L on the index ring R. The dial unit M may be displaced inwardly against spring 65 to its maximum position of inward displacement at which the rear edges 32a and 34a of the dial body 30 are engaged against the forward side of the bearing cap 16 within and surrounded by the index ring R. With the relationship provided between the scale S on dial body 30 and the index line L on the index ring R, it is possible to quickly and accurately read the scale from and against the index line L. In addition to adjustment of the index unit M relative to the feed screw C, it is also possible to adjust the index ring R to set the index line L in desired position relative to scale S on dial body 30, by loosening the locking screw 75 and rotating the ring in either direction through a desired angle to locate the index line L at the required position.

It will also be recognized that one of the fundamental problems encountered with micrometer dials mounted on and with power driven rotary elements arises out of the large inertia forces which will act on the dial to displace it from an adjusted position. In the mechanism of my present invention a positive connection for the dial in an adjusted position is attained.

A micrometer dial mechanism has thus been provided which, except for the adjustable index ring R, embodies but a single primary operating component with a simple biasing spring for such component. This operating component is comprised by the micrometer dial unit M which by a single, unitary member provides both the micrometer dial body and the manual operating member or knob, and such single member is so mounted and assembled that the operating knob or finger grasping rim 35 thereof is located in readily accessible position to the operator for actuation to position for adjustment by merely pressing the single member inwardly for displacement as a unit. The mounting for such unitary dial and operating knob is essentially comprised of but two members, namely the clamp plate 40 and the dial drive clutch 50, both of which are of relatively simple structure capable of both low cost manufacture and assembly. A micrometer dial mechanism of my invention thus provides for extreme ease of operation and precision of adjustment of both the dial unit and the index ring mounted in cooperative association therewith structurally and visually, with infinite adjustment settings possible and error potential reduced to a minimum.

While I have selected and disclosed herein as an example a specific embodiment and adaptation of the invention, it will be evident to those skilled in the art that various changes, modifications, substitutions, eliminations and additions, as well as other uses and adaptations, may be resorted to without departing from the broad spirit and scope of my invention, and, hence, it is not intended to limit the invention in all respects to the exact and specific disclosures of the example embodiment hereof, except as may be required by clearly intended limitations thereto included in any of the claims hereto appended.

What I claim is:

1. In combination, a rotary shaft; a bearing member fixed on said shaft and providing a circular, exterior bearing surface therearound concentric with said shaft; a first clutch member fixed on said shaft in position spaced axially thereon from said bearing member and being formed to provide therearound a circular bearing surface concentric with said shaft; said first clutch member having clutch teeth on the side thereof facing said bearing member; a micrometer dial unit rotatably mounted on said bearing member and said clutch member bearing surfaces for rotation thereon independently thereof and for movements bodily thereon in either direction axially of said rotary shaft; a second clutch member mounted in said dial unit in position disposed between said bearing member and said first clutch member and being movable as a unit with said dial unit; said second clutch member having clutch teeth thereon on the side thereof facing the clutch teeth on said first clutch member; a spring unit mounted between said bearing member on said rotary shaft and said second clutch member on said dial unit and being adapted to continuously bias said dial unit toward said first clutch member to a first position with the clutch teeth of said first and second clutch members engaged to positively connect said dial unit in driven connection with said rotary shaft; said dial unit being adapted to be displaced axially from said first position by the application of manual pressures thereto acting in a direction toward said bearing member to a second position with the clutch teeth of said first and second clutch members disengaged; said dial unit in said second position being rotatable on and independently of said bearing member and first clutch member to selected positions of angular adjustment thereon relative to said rotary shaft; and said dial unit upon the removal of manual pressure therefrom when it is in said second position being adapted to be restored automatically to said first position by said spring unit.

2. In combination, a support structure; a rotary shaft extended through said support structure and providing at one side thereof a shaft extension; a micrometer dial unit mounted on said shaft extension for displacement bodily as a unit axially of said shaft extension toward and from said fixed support; said dial unit being also mounted for rotation on and independently of said shaft extension; clutch mechanism operatively associated between said dial unit and said shaft extension and being adapted to releasably engage said dial unit in driven connection with said shaft extension in a first position of said unit displaced axially of said rotary element a distance spaced outwardly from said support structure; said dial unit being adapted to be displaced axially of said shaft extension inwardly thereof from said first position toward said fixed support to a second position; said clutch mechanism being adapted to be actuated to release said dial unit from driven connection with said rotary element by the movement of said unit axially thereof to said second position; said dial unit in said second position being adapted to be rotated independently of said shaft extension to selected positions of angular adjustment therearound; spring means adapted to continuously bias said dial unit to and to hold said unit in said first position; and said dial unit including a manual operating knob extended from the side thereof opposite said fixed support structure for manual displacement of said dial unit inwardly of said rotary element from said first position to said second position against the biasing action of said spring means.

3. In combination, a support structure; a shaft extending outwardly from one side of said support structure; a micrometer dial unit including a circular dial body having a micrometer scale on and around the exterior, circular side thereof and an operating knob at the end of said dial body opposite said support structure; said dial unit being mounted on said shaft with said dial body concentric therewith; said dial unit being also mounted for movements in either direction as a unit axially of said shaft and for rotation on and independently of the shaft; clutch mechanism mounted and housed within said dial unit and being adapted to engage said dial unit in positive driven connection with said shaft when said dial unit is in a first position displaced outwardly on said shaft spaced a distance from said support structure and to release said dial unit for independent rotation on said shaft when the dial unit is displaced axially from said first position inwardly of said shaft toward said support structure to a second position; spring means adapted to continuously bias said dial unit to said first position; and said dial unit being displaceable inwardly of said shaft from said first position to said second position by the application of manual pressures to said operating knob acting in a direction toward said support structure.

4. In combination, a support structure; a rotary shaft extended outwardly from said support structure at one side thereof; an index ring rotatably mounted on the side of said support structure from which said shaft extends in position thereon concentric with said shaft; said index ring having an index mark on the outer peripheral side thereof; means for releasably locking said index ring in an angularly adjusted position on said support structure relative to said shaft; a micrometer dial unit mounted on said shaft at the outer side of said index ring; said dial unit including a circular dial body positioned concentric with said shaft and said index ring and having an external diameter to be received in said ring at the outer side of said support structure with said ring being extended outwardly a distance over the exterior of said dial body; said dial body having a micrometer scale on and around the outer side thereof in reading relation with the index line on said index ring; said dial unit including a tubular extension extending outwardly from the side of said dial body opposite said index ring and being formed at its outer free end to provide a finger grasping rim; said dial unit being mounted on said shaft for bodily movements axially thereof toward and from said index ring and for rotation independently thereof to adjusted positions thereon; clutch means mounted and housed with said dial unit for releasably engaging said dial unit in driving connection with and against rotation independently of said shaft with said unit in a first position on said shaft displaced outwardly from said support structure; spring means adapted to continuously bias said dial unit to and to maintain it in said first position; said clutch means being adapted to be actuated to release said dial unit from said shaft for rotation of said unit relative to the shaft by movements of said unit in a direction toward said support structure and into said index ring; and said dial unit being displaceable from said first position to said second position by the application of inwardly acting pressures applied manually to the finger-grasping rim at the outer free end of said tubular extension of said dial unit to push said dial unit inwardly on said shaft.

5. In combination, a support structure; a rotary shaft extending outwardly from said support structure at one side thereof; a micrometer dial unit mounted on said shaft at the outer side of said support structure; said dial unit including a circular dial body positioned concentric with said shaft; said dial body having a micrometer scale on and around the exterior side thereof and also including a tubular extension extending outwardly from the side thereof opposite said support structure; said tubular extension providing an outer free end forming a manual operating knob for said dial unit; said dial unit being mounted on said shaft for bodily movements as a unit axially thereof toward and from said support structure and for rotation independently of said shaft to positions of angular adjustment therearound; clutch means mounted and housing within said dial unit for releasably engaging said dial unit in driven connection with and against rotation independently of such shaft when said dial unit is displaced outwardly of said shaft into a first position spaced outwardly a distance thereon from said support structure; spring means adapted to continuously bias said dial unit to and to maintain it in said first position; said clutch means being operatively connected with said dial unit and being adapted to be actuated thereby to release said unit from said shaft for rotation independently of the shaft by movements of said dial unit in a direction inwardly toward said support structure to a second position on said shaft; and said dial unit being adapted to be displaced from said first position to said second position by manually pressing said dial unit inwardly toward said support structure against the biasing forces exerted thereon by said spring means.

6. In combination, a support structure; a rotary shaft extending outwardly from said support structure at one side thereof; a micrometer dial unit mounted on said shaft at the outer side of said support structure; said dial unit including a circular dial body having a micrometer scale around the circular peripheral exterior surface thereof and a tubular extension projecting axially and outwardly from the side of said dial body opposite said support structure; said dial unit being mounted on said shaft in position concentric therewith for movements as a unit in either direction axially therealong and for rotation therearound independently thereof; clutch means mounted and housed within said dial body and said tubular extension thereof; said clutch means being adapted to releasably engage said dial unit driven connection with said shaft in a first position of said unit displaced outwardly on said shaft from said support structure; spring means adapted to continuously bias said unit to and yieldingly maintain the unit in said first position; said clutch mechanism being adapted to be actuated by said dial unit to release said dial unit from driven connection with said shaft for rotation of the dial unit independently of the shaft by movement of said unit inwardly from said first position toward said support structure to a second position; and said dial unit being displaceable inwardly from said first position engaged in driven connection with said shaft to said second position disengaged from said shaft by manually pushing inwardly on said outwardly projecting tubular extension of the dial body of said dial unit.

7. In combination, a rotary shaft; a support structure spaced a distance inwardly of said shaft; an index ring mounted on the outer side of said support structure around and concentric with said shaft; said index ring being mounted for rotation on said support structure to selected positions of adjustment around said shaft; manually operable means for releasably securing said index ring in any position of adjustment; a micrometer dial unit mounted on said shaft concentric therewith at the outer side of said support structure; said dial unit being mounted for movements in either direction axially of said shaft toward and from said support structure and index ring and being also mounted for rotation on and independently of said shaft; said dial unit having a first position on said shaft spaced outwardly thereon from said support structure and a second position spaced inwardly from said first position toward said support structure; spring means adapted to continuously bias said dial unit to and yieldingly maintain it in said first position; said dial unit being displaceable inwardly against the biasing action of said spring means toward said index ring from said first position to said second position by the application of manual pressure to the outer side of said dial unit; clutch mechanism housed within said dial unit between said unit and said rotary shaft for engaging said dial unit in driven connection with said shaft and for disengaging said unit from said shaft for independent rotation; and said clutch mechanism being operatively associated with said shaft and said dial unit and being operable by movement of said dial unit to said first position to engage the said unit with said shaft and by movement of said dial unit from said first position inwardly to said second position to disengage said unit from said shaft for independent rotation of said dial unit to adjusted positions on the shaft.

8. In combination, a rotary shaft; a support structure spaced a distance inwardly of said shaft; an index ring mounted on the outer side of said support structure around and concentric with said shaft; said index ring being extended a distance outwardly beyond the outer side of said support structure to provide a circular space therewithin open at the forward side thereof; said index ring being provided with an index mark on the outer peripheral side thereof and being mounted for rotation to angularly adjust the position of said index mark around said rotary shaft; a micrometer dial unit mounted on said shaft at the outer side of said support structure for movements as a unit axially of said shaft inwardly toward and outwardly from said index ring; said dial unit having a circular dial body concentric with said shaft and having an external diameter to slidably fit into the forwardly open space within said index ring; the inner edge of said dial body formed to provide a surface adapted to abut against the adjacent surface of said support structure within said index ring with said dial unit in its position of maximum inward displacement on said rotary shaft; a micrometer scale on and around the exterior peripheral surface of said dial body; clutch mechanism for releasably engaging said dial unit in driven connection with said shaft, including, a clutch member fixed on said shaft for rotation therewith in position located within said dial unit spaced outwardly from said support structure, and a clutch member fixed to said dial body in position therewithin located between said shaft mounted clutch member and said support structure; said dial unit being movable outwardly on said shaft to a first position with said clutch members engaged to connect said dial unit in driven connection with said shaft; said dial unit being movable inwardly on said shaft from said first position to a second position extending into said index ring with said clutch members disengaged to release said dial unit for independent rotation on said shaft; spring means adapted to continuously bias said dial unit outwardly on said shaft from said second position to said first position; and said dial unit being adapted to be displaced inwardly from said first position to said second position by manually applying inwardly acting pressures thereon at the outer side thereof.

9. In combination, a rotary shaft; a support structure spaced a distance inwardly of said shaft; a micrometer dial unit mounted on said shaft at the outer side of said support structure for movements as a unit axially of said shaft toward and from said support structure; said dial unit being also mounted for rotation independently of said shaft to selected positions of adjustment therearound; said dial unit including a circular dial body concentric with said shaft and a tubular extension extended axially from said dial body at the side thereof opposite said support structure and receiving therethrough said rotary shaft; the said tubular extension having an external diameter less than the external diameter of said dial body and being formed at its outer free end with an annular finger grasping rim therearound; clutch means housed within said dial unit adapted in a first position of said unit on said shaft to releasably engage said dial unit in driven connection with said shaft; said dial unit being displaceable inwardly of said shaft toward said support structure to a second position at which said clutch means is adapted to disconnect said dial unit from said shaft for rotation of said unit to adjusted positions on and around said shaft; spring means housed within said dial unit and being adapted to continuously bias said unit outwardly to said first position; said dial unit being adapted to be pushed inwardly against said spring means from said first position to said second position by applying inwardly acting manual pressures to said finger grasping rim at the outer end of said tubular extension of said dial body; and said spring means being adapted to restore said dial unit from said second position to said first position upon the removal therefrom of the inwardly acting pressures applied thereto at the outer end of said dial body tubular extension.

10. In combination, a support structure; a shaft extending outwardly from one side of said support structure; a micrometer dial unit including a circular dial body having a micrometer scale on and around the exterior peripheral side thereof; said dial unit being mounted on said shaft with said dial body concentric with the shaft; said dial unit being also mounted for movements in either direction axially of said shaft toward and from said support structure and for rotation on and independently of said shaft; clutch mechanism mounted and housed within said dial unit and being comprised of a clutch member fixed on said shaft within said dial unit at a location spaced outwardly from said support structure and a clutch member fixed on and within said dial unit for rotation therewith; said clutch members being adapted to be engaged to connect said dial unit in driven relation with said shaft when said dial unit is in a first position displaced outwardly on said shaft spaced from said support structure and to be disengaged to release said dial unit for independent rotation when said dial unit is displaced inwardly from said first position to a second position; spring means adapted to continuously bias said dial unit from said second position outwardly on said shaft to said first position; and said dial unit being displaceable inwardly on said shaft from said first position to said second position by the application of manual pressures thereto at the side thereof opposite said support structure.

References Cited in the file of this patent

UNITED STATES PATENTS

| Number | Name | Date |
|---|---|---|
| 2,319,480 | Saving et al. | May 18, 1943 |
| 2,612,134 | Henkes et al. | Sept. 30, 1952 |